(12) United States Patent
Yoshimura (10) Patent No.: US 8,289,600 B2
(45) Date of Patent: Oct. 16, 2012

(54) OPTICAL SCANNING DEVICE, LIGHT SCREENING MATERIAL, METHOD FOR SCREENING FLARE LIGHT, AND IMAGE FORMATION APPARATUS

(75) Inventor: Kenichi Yoshimura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 481 days.

(21) Appl. No.: 11/857,299

(22) Filed: Sep. 18, 2007

(65) Prior Publication Data

US 2008/0068692 A1 Mar. 20, 2008

(30) Foreign Application Priority Data

Sep. 19, 2006 (JP) .................................. 2006-253501

(51) Int. Cl.
*G02B 26/08* (2006.01)
(52) U.S. Cl. ..................................... 359/204.1; 347/224
(58) Field of Classification Search .... 359/196.1–226.3; 347/224–225, 233, 241–243, 258–263
See application file for complete search history.

(56) References Cited

U.S. PATENT DOCUMENTS

| 2004/0263933 | A1* | 12/2004 | Nakahata ...................... | 359/196 |
| 2006/0055769 | A1* | 3/2006 | Yamazaki et al. ............. | 347/243 |
| 2006/0139440 | A1 | 6/2006 | Tomita | |
| 2007/0053040 | A1* | 3/2007 | Sakaue et al. .................. | 359/204 |

FOREIGN PATENT DOCUMENTS

| CN | 1790091 A | 6/2006 |
| JP | 2002-196269 | 7/2002 |
| JP | 2003-202512 | 7/2003 |
| JP | 2003-322818 | 11/2003 |
| JP | 2006-30706 | 2/2006 |

OTHER PUBLICATIONS

Office Action issued Feb. 7, 2012 in Japanese Patent Application No. 2006-253501.

* cited by examiner

*Primary Examiner* — Jennifer L. Doak
(74) *Attorney, Agent, or Firm* — Oblon, Spivak, McClelland, Maier & Neustadt, L.L.P.

(57) ABSTRACT

A disclosed optical scanning device includes: a plurality of light beam irradiation devices irradiating a light beam; a deflector deflecting the plural light beams irradiated from the light beam irradiation devices into substantially opposite directions; scanning optical systems disposed substantially in an opposing manner relative to the deflector as a center, the scanning optical systems each scanning a scanning surface using the light beam deflected by the deflector; and at least one light screening material screening a flare light emitted from a first scanning lens in the scanning optical system so as to prevent the flare light from being projected onto a second scanning lens in the substantially opposite scanning optical system. The light screening material screening the flare light emitted from the first scanning lens is disposed more closely to the second scanning lens than to the first scanning lens.

7 Claims, 12 Drawing Sheets

OPTICAL SCANNING DEVICE, LIGHT SCREENING MATERIAL, METHOD FOR SCREENING FLARE LIGHT, AND IMAGE FORMATION APPARATUS

BACKGROUND OF THE INVENTION

1. Field of the Invention

The present invention relates to an optical scanning device, light screening material, method for screening a flare light, and image formation apparatus.

2. Description of the Related Art

Conventionally, in an optical scanning device installed on an electrophotographic image formation apparatus such as a laser printer, copier, and the like, a light beam irradiated from a light-beam irradiation device including a laser light source in accordance with an image signal is periodically deflected using a deflector including a rotating polygon mirror (polygon mirror), for example. The deflected light beam is imaged on a scanning surface of a photosensitive recording medium (photoconductor drum) using a scanning optical system. Image recording is performed from the image.

Figure 1:
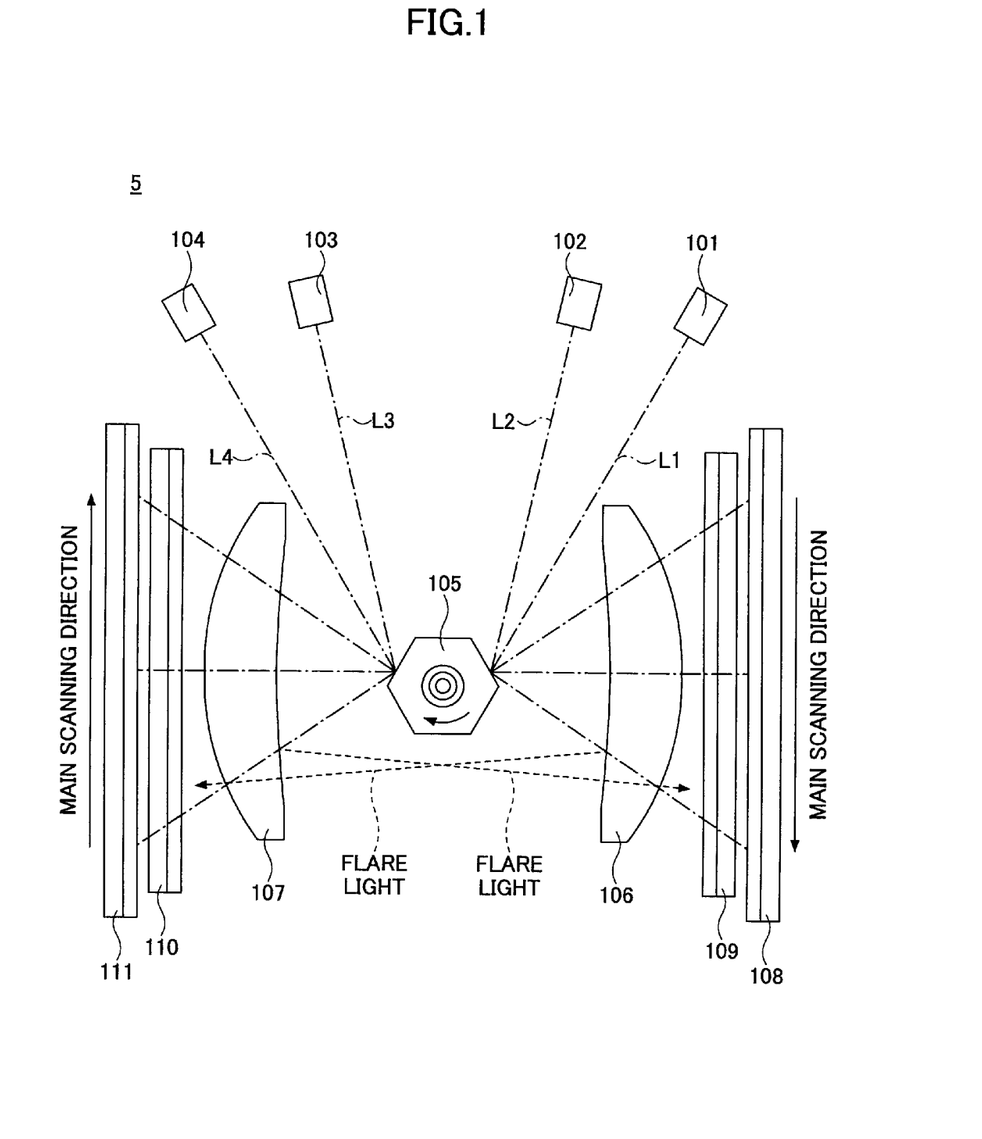
FIG. 1 is a plan view showing a conventional optical scanning device without a light screening material.

Specifically, FIG. 1 is a schematic plan view showing a conventional optical scanning device. In FIG. 1, a light beam emitted from light-beam irradiation devices 101 to 104 is irradiated onto a deflection surface (reflection surface) of a deflector 105 such as a polygon mirror. The light beam reflected and deflected on the deflection surface of the deflector 105 is guided on scanning surfaces of photoconductor drums 108 and 111 via scanning optical systems 109 and 110. By rotating the deflector 105, it is possible to perform optical scanning on the scanning surfaces of the photoconductor drums so as to transmit and record image information. In FIG. 1, four light beams are irradiated onto the deflector 105 and four deflected light beams are used for optical scanning. However, two pairs of scanning optical systems are overlapped each other, so that only two scanning optical systems are illustrated. In this case, in each scanning lens of the scanning optical systems disposed in an opposing manner, a portion of projected light beam is reflected on a surface of the lens and scattered as a flare light. When the flare light is projected onto the scanning lens of the opposite scanning optical system, the light is guided to the scanning surface on the opposite side via the scanning optical system and noise is generated on image information to be recorded, so that a streak stain or a ghost image is generated on a formed image. Or, a ground stain or blur is generated in accordance with covering with the flare light. This would cause degradation of image quality. In some cases, plural scanning lenses are disposed in each scanning optical system. However, in the present invention, the scanning lens refers to a scanning lens onto which the light beam from the deflector is first projected unless otherwise specified.

In view of this, there is known an antireflection film deposited on a surface of the scanning lens so as to reduce the flare light. Further, there is a technique of providing a light screening function to a case for controlling noise accompanied by high-speed rotation of the polygon mirror, in which the case is made opaque except windows for light projected onto the polygon mirror and light reflected on the polygon mirror. However, in proportion as an intense light beam is used and high-quality image formation is required, even a slight amount of flare light would cause considerable degradation upon image formation.

Figure 2:
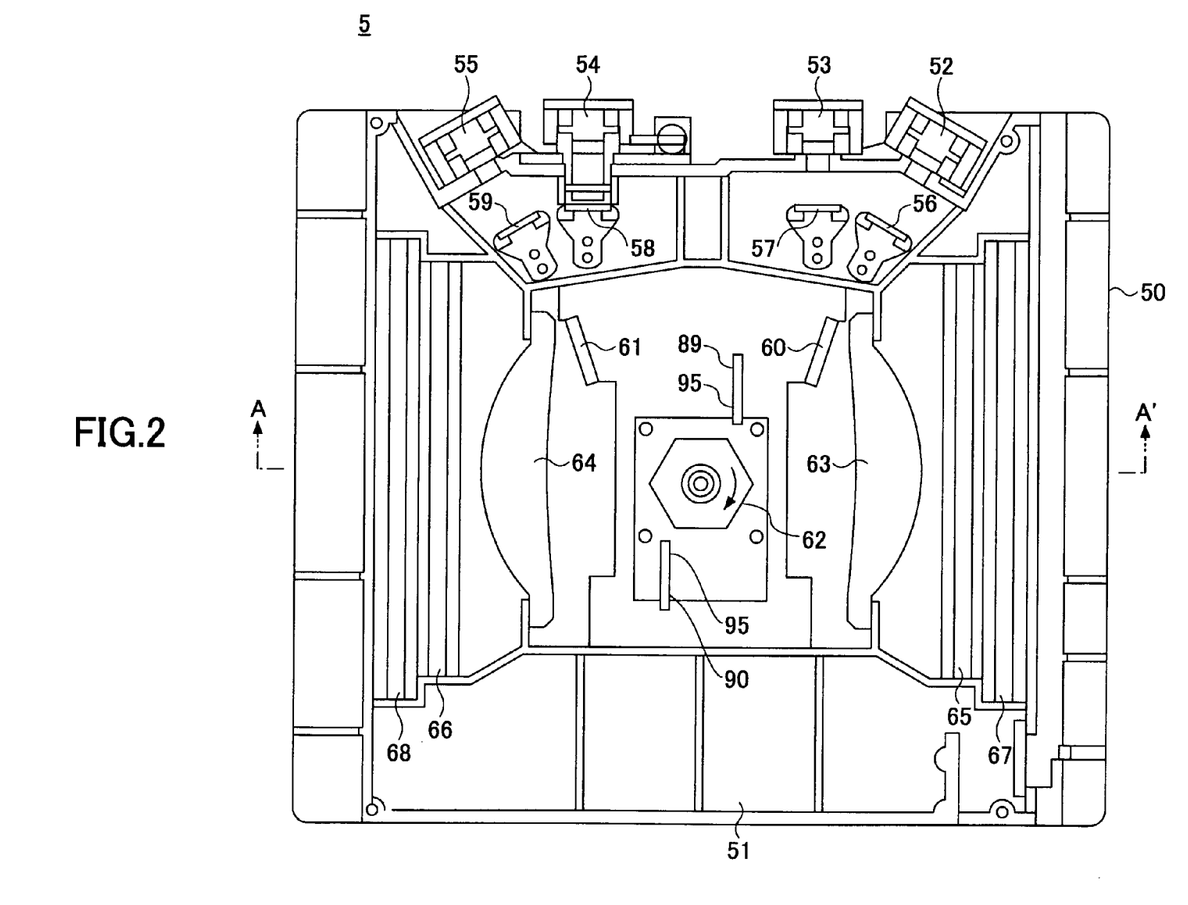
FIG. 2 is a diagram showing a conventional optical scanning device.

In order to prevent such a flare light from entering the opposite scanning lens, a light screening material is disclosed (refer to Patent Document 1). FIG. 2 shows an example.

Although FIG. 2 shows an optical scanning device almost the same as in FIG. 1, in FIG. 2, two light screening materials 89 and 90 are disposed in the vicinity of a deflector 62. The light screening materials 89 and 90 each screens flare lights with both surfaces, the flare lights being reflected from scanning lenses 63 and 64 disposed in an opposing manner. For example, in the light screening material 89, the flare light reflected from the scanning lens 63 is screened with a right side surface in the figure and the flare light reflected from the scanning lens 64 is screened with a left side surface in the figure. In this manner, it is possible to screen flare lights of four locations using two light screening materials and to efficiently screen the flare light.

Patent Document 2 discloses an optical scanning device in which the light screening material for screening the flare light is disposed on a non-active area (area not used as an optical path of a light beam) so as to prevent the flare light from entering the opposite scanning lens, the non-active area being positioned between an optical path of light flux projected on the deflection surface of the deflector and an optical path of scanning light flux deflected on the deflection surface.

Patent Document 1: Japanese Laid-Open Patent Application No. 2002-196269

Patent Document 2: Japanese Laid-Open Patent Application No. 2003-202512

As mentioned above, optical scanning devices provided with a light screening material for screening the flare light have been proposed and an effect of screening the flare light has been sufficiently acknowledged. However, when the light screening material is disposed in the vicinity of the deflector as mentioned above, a sound of wind noise accompanied by rotation of the deflector is increased and this poses a problem in some cases. Such a sound of wind noise from the deflector has been problematic and a case of the deflector, for example, has been used so as to reduce the sound. However, when the light scanning material is disposed closely to the deflector, this light scanning material functions as a baffle board and the sound of wind noise is likely to be increased. However, in the methods disclosed in Patent Documents 1 and 2, unless the light screening material is disposed in the vicinity of the deflector, the effect of screening the flare light becomes insufficient. In view of this, there have been demands for developing an optical scanning device having the light screening material sufficiently capable of screening the flare light or an optical scanning device with a light screening structure without increasing the sound of wind noise.

SUMMARY OF THE INVENTION

It is a general object of the present invention to provide an improved and useful optical scanning device, light screening material, method for screening a flare light, and image formation apparatus using the optical scanning device in which the above-mentioned problems are eliminated.

A more specific object of the present invention is to provide an optical scanning device, light screening material, method for screening a flare light, and image formation apparatus using the optical scanning device, in which the noise of the light screening material and the deflector is reduced, the light screening material screening the flare light generated from the scanning lens, and the screening of the flare light is effectively performed in the optical scanning device having scanning optical systems disposed in an opposing manner.

According to one aspect of the present invention, there is provided an optical scanning device comprising: a plurality of light beam irradiation devices irradiating a light beam; a deflector deflecting the plural light beams irradiated from the light beam irradiation devices into substantially opposite directions; scanning optical systems disposed substantially in an opposing manner relative to the deflector as a center, the scanning optical systems each scanning a scanning surface using the light beam deflected by the deflector; and at least one light screening material screening a flare light emitted from a first scanning lens in the scanning optical system so as to prevent the flare light from being projected onto a second scanning lens in the substantially opposite scanning optical system, wherein the light screening material screening the flare light emitted from the first scanning lens is disposed more closely to the second scanning lens than to the first scanning lens.

According to another aspect of the present invention, in the optical scanning device, when the optical scanning device is viewed from an axis direction of the deflector, the light screening material screening the flare light emitted from the first scanning lens is disposed on the same side as the light beam irradiation device irradiating the light beam to be projected onto the second scanning lens relative to a line defined by connecting a center of the first scanning lens to a center of the second scanning lens.

According to another aspect of the present invention, in the optical scanning device, when the optical scanning device is viewed from an axis direction of the deflector, the light screening material screening the flare light emitted from the first scanning lens is disposed on an area of a second scanning lens side relative to an optical path of the light beam irradiated from the light beam irradiation device to the deflector and projected onto the second scanning lens and on an area of an optical path side of the light beam relative to an optical path of the light beam irradiated from the deflector onto the second scanning lens.

According to another aspect of the present invention, in the optical scanning device, when the optical scanning device is viewed from an axis direction of the deflector, the light screening material screening the flare light emitted from the first scanning lens is disposed on the opposite side of the light beam irradiation device irradiating the light beam to be projected onto the second scanning lens relative to a line defined by connecting a center of the first scanning lens to a center of the second scanning lens.

According to another aspect of the present invention, in the optical scanning device, the light screening material has a plate-like shape and is disposed such that a plane including a light screening surface is not overlapped with a central axis of the deflector.

According to another aspect of the present invention, in the optical scanning device, when a given light screening material faces a corner where deflection surfaces of the deflector are brought into contact, other light screening materials are disposed so as not to face a corner where the deflection surfaces of the deflector are brought into contact.

According to another aspect of the present invention, in the optical scanning device, the light screening material has a curved shape so as to surround the deflector.

According to another aspect of the present invention, in the optical scanning device, the light screening material is fixed on a case containing the deflector.

According to another aspect of the present invention, there is provided a light screening material disposed on an optical scanning device including: a plurality of light beam irradiation devices irradiating a light beam; a deflector deflecting the plural light beams irradiated from the light beam irradiation devices into substantially opposite directions; and scanning optical systems disposed substantially in an opposing manner relative to the deflector as a center, the scanning optical systems each scanning a scanning surface using the light beam deflected by the deflector, the light screening material comprising: a slit, wherein the light screening material screens a flare light emitted from one of scanning lenses disposed in an opposing manner in the scanning optical systems disposed substantially in an opposing manner.

According to another aspect of the present invention, any one of the optical scanning devices mentioned above includes the aforementioned light screening material.

According to another aspect of the present invention, there is provided a method for screening a flare light in an optical scanning device including: a plurality of light beam irradiation devices irradiating a light beam; a deflector deflecting the plural light beams irradiated from the light beam irradiation devices into substantially opposite directions; and a scanning optical system scanning a scanning surface using each of the light beams deflected by the deflector, the method comprising the step of: disposing at least one light screening material screening the flare light emitted from a scanning lens more closely to a scanning lens to be shielded from the flare light than to the scanning lens emitting the flare light.

According to another aspect of the present invention, in the method for screening a flare light, a slit is disposed on the light screening material.

According to another aspect of the present invention, there is provided an image formation apparatus comprising an optical scanning device including: any one of the above-mentioned optical scanning devices.

According to the optical scanning device, light screening material, and method for screening a flare light according to the present invention, the flare light generated from the scanning lens is effectively screened and is prevented from being projected onto the scanning lens disposed in an opposing manner. Further, it is possible to reduce noise generated from the light screening material and the deflector. Moreover, the image formation apparatus according to the present invention is capable of performing clear image formation and reducing noise generated from the optical scanning device.

Other objects, features and advantage of the present invention will become more apparent from the following detailed description when read in conjunction with the accompanying drawings.

DETAILED DESCRIPTION OF THE PREFERRED EMBODIMENTS

In the following, embodiments of the present invention will be described with reference to the accompanying drawings. An optical scanning device in this embodiment includes: a deflector for deflecting plural light beams from light beam irradiation devices into two substantially opposite directions relative to the deflector; and a scanning optical system for guiding the plural light beams deflected for scanning by the deflector to each of corresponding scanning surfaces so as to perform imaging. The light beam irradiation devices, deflector, and scanning optical system are contained in a single housing. The light beam irradiation device includes an optical system for irradiating a light beam provided with a light source such as a laser light source and a collimator lens for irradiating a light beam from the light source as a light beam made of a substantially parallel light beam onto the deflector or a cylindrical lens. The deflector usually includes plural rotating polygon mirrors, oscillating mirrors, or the like. The rotating polygon mirror has a rotation center as a central axis. The oscillating mirror also has a rotation center and performs oscillation as rotation movement, so that the rotation center is regarded as a central axis in the following description. The scanning optical system includes a scanning lens for condensing a light beam on the scanning surface, an optical path changing mirror, and the like. Although a single scanning lens may be used in principle, plural scanning lenses are used in many cases. In such cases, the scanning lens described in the present invention refers to a scanning lens onto which the light beam from the deflector is first projected. The scanning surface is a surface of a photoconductor such as a photoconductor drum.

In the optical scanning device, a light screening material for screening reflected or scattered light (flare light) from the scanning lens of the scanning optical system is disposed in the vicinity of the deflector and is outside a light beam deflection and scanning area by the deflector, namely, outside an optical path of the light beam irradiated from the light beam irradiation device, deflected by the deflector, and projected on the scanning optical system. By disposing the light screening material outside the light beam deflection and scanning area, the light scanning material is configured not to block travel of the light beam. Then, the light screening material is disposed with reference to a scanning lens (hereafter referred to as a first scanning lens) generating the flare light and more closely to an opposite scanning lens (hereafter referred to as a second scanning lens). By disposing light screening materials closely to each of the opposite scanning lenses in this manner, it is possible to prevent the flare light generated by each scanning lens from being irradiated onto the scanning surface via the opposite scanning optical system. In accordance with this, it is possible to prevent generation of a ghost image recorded on the photoconductor and degradation of image quality such as a streak stain and the like. On the other hand, by constructing the optical scanning device in this manner, the light screening material is disposed in the vicinity of the scanning lens (second scanning lens) to be shielded from the flare light generated by the first scanning lens, so that the light screening material is relatively remote from the deflector. Thus, it is possible to prevent an increase of noise from the deflector generated when the light screening material is positioned closely to the deflector. Further, a possibility of damaging the reflection surface or the like by the light screening material, for example, is reduced upon manufacturing the optical scanning device or occurrence of trouble.

Figure 3:
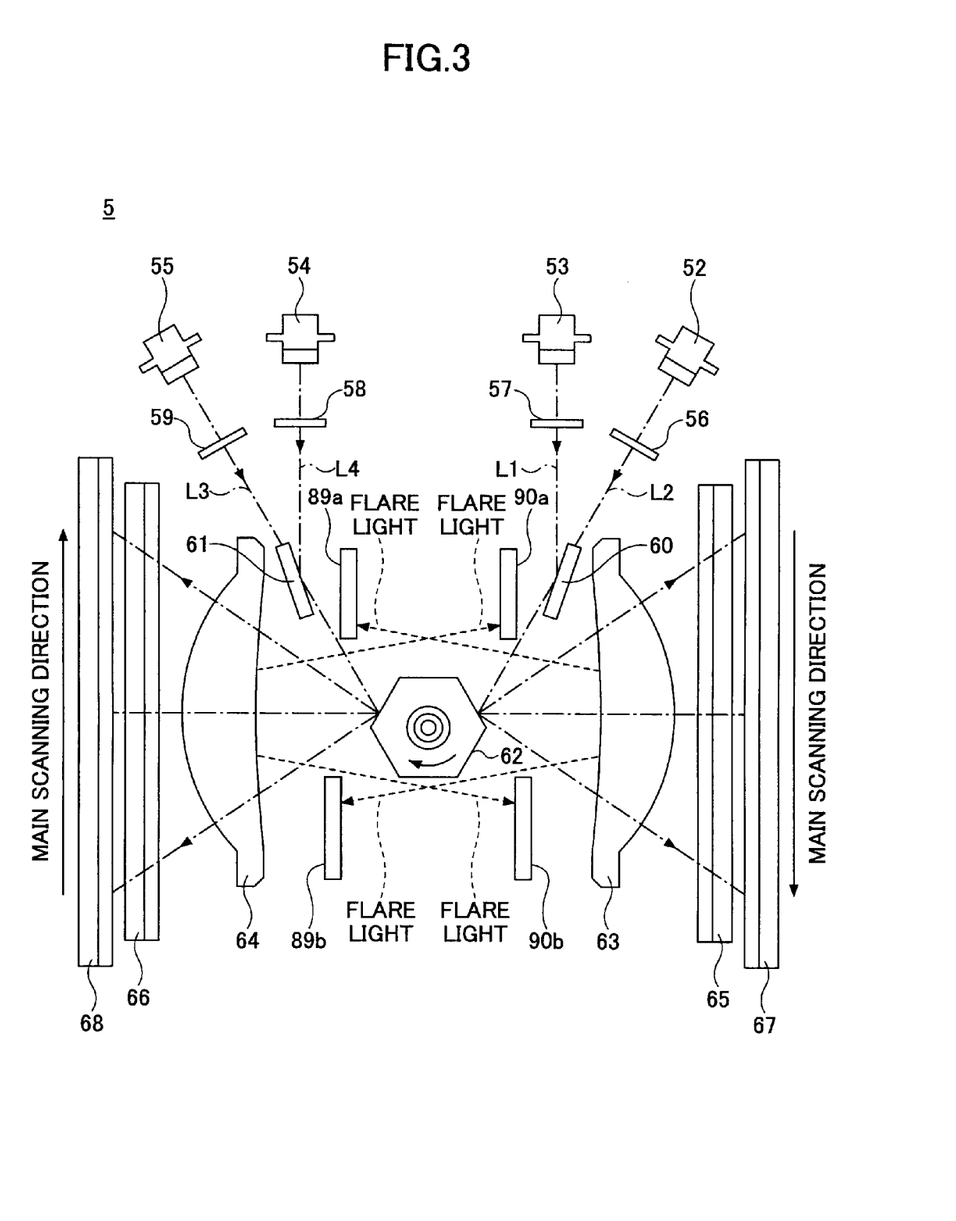
FIG. 3 is a plan view showing an optical scanning device according to the present invention.

In the following, specific example is described with reference to FIG. 3 showing a plan view of an optical scanning device according to the present invention. In the optical scanning device, scanning optical systems are disposed in a substantially symmetrical manner relative to the deflector 62 as a center. The single deflector 62 deflects four light beams into two sets of light flux in each of two substantially opposite directions for scanning. In addition, two pairs of the scanning optical systems are overlapped each other in the back and forth of the diagram in an orthogonal direction of the plan view, so that only two of the scanning optical systems are shown. In this case, there is a possibility that the flare light from the scanning optical systems opposite to each other would pose a problem of image failure such as a ghost image to the opposite scanning optical system. For example, if a light screening material 89a is not disposed, when a light beam is reflected and scattered on an incidence plane of the scanning lens 63 for imaging, the reflected and scattered light (flare light) travels in a direction of the opposite scanning lens 64 and enters a scanning optical system 66 including the scanning lens 64. The flare light which has entered the scanning optical system 66 is irradiated onto an image carrier 68 via the scanning optical system 66. When the flare light is irradiated onto the image carrier 68, a streak stain or a ghost image is generated on a formed image. Or, a ground stain or blur is generated in accordance with covering with the flare light. This would cause degradation of image quality. The light screening material 89a and a light screening material 89b are disposed so as to prevent the flare light from entering the scanning lens 64 for imaging on the opposite side and to prevent the flare light from being irradiated onto the scanning surface of the image carrier. On the other hand, when the light screening material is disposed closely to the deflector, although the flare light is screened, an air flow generated in accordance with the rotation of the deflector is disturbed due to the light screening material, so that the increase of noise is problematic. In view of this, in the present embodiment, the light screening material is disposed more closely to the scanning lens 64 to be shielded from the flare light relative to the scanning lens 63 generating the flare light. In accordance with this, it is possible to dispose the light screening material remote from the deflector while the effect of screening the flare light is provided. When the light screening material is disposed in a remote manner from the deflector, the deflector has no influence on the noise generated by the rotation of the deflector. In this case, when the light screening material is disposed in a remote manner from the deflector as much as possible, it is necessary to prevent the light screening material from being disposed excessively close to the scanning lens 64 and blocking an optical path of a light beam irradiated from the light beam irradiation device, deflected by the deflector 62, and projected onto the scanning lens 64.

Figure 4:
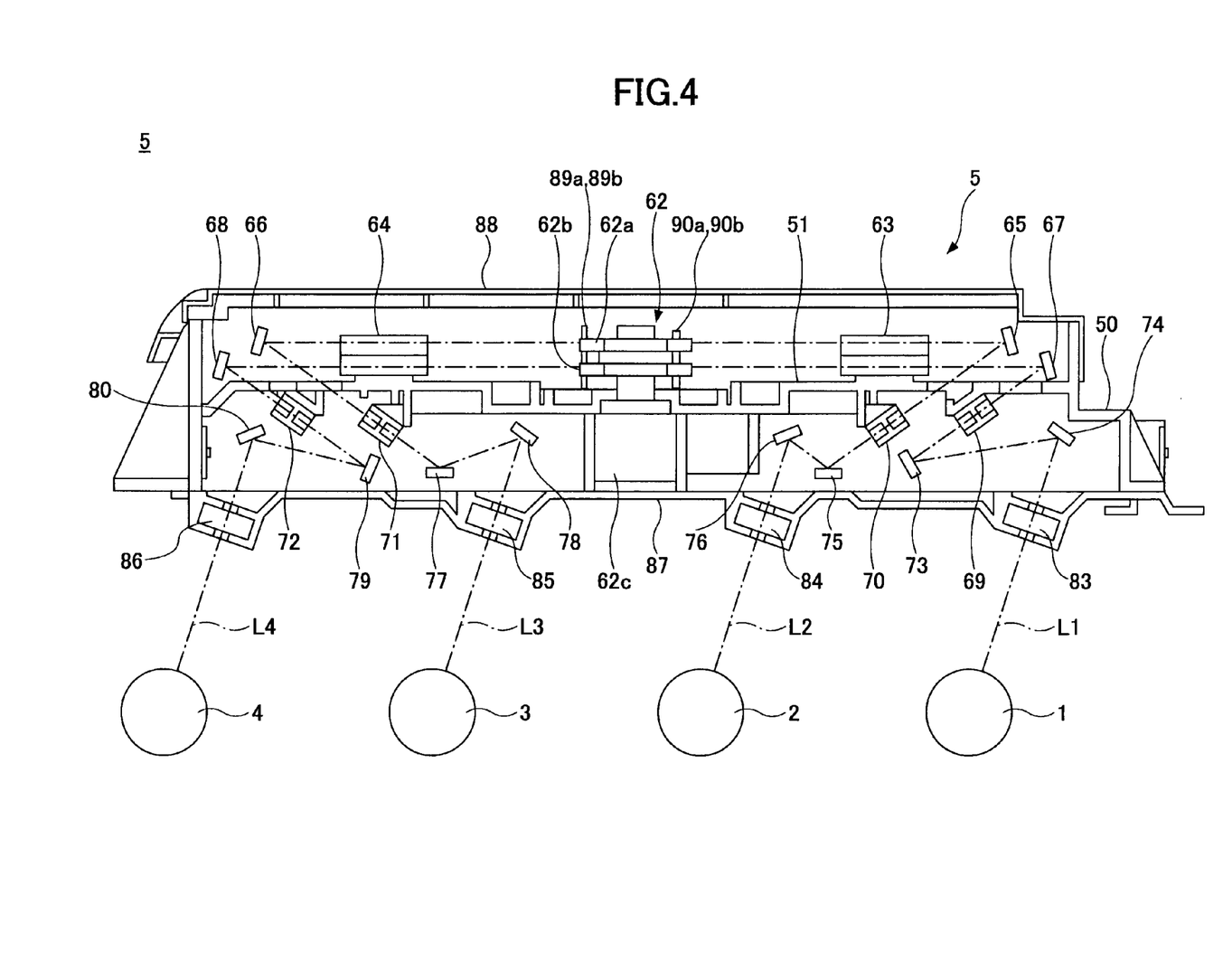
FIG. 4 is a cross-sectional view showing an optical scanning device according to the present invention.
Figure 5:
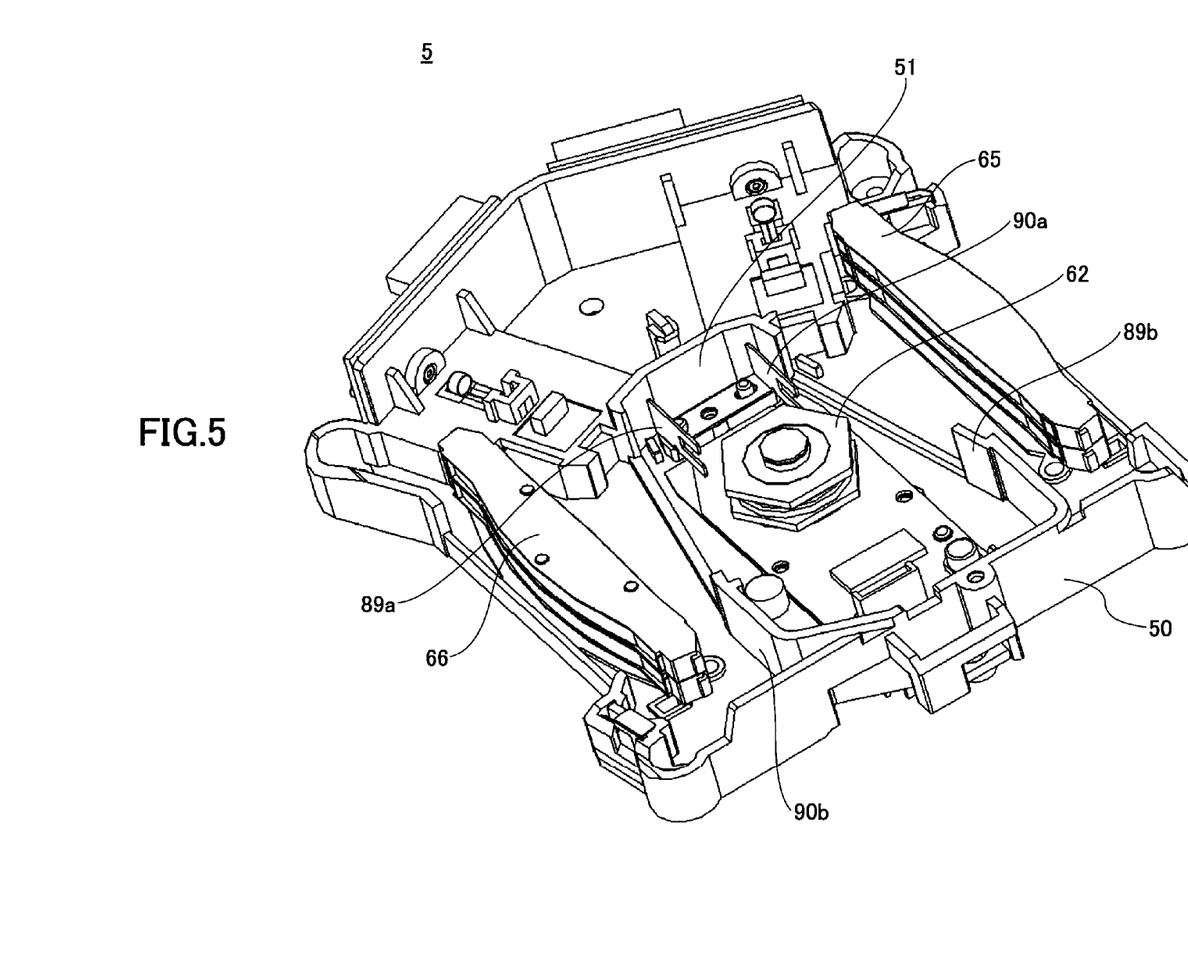
FIG. 5 is an internal perspective view showing an optical scanning device according to the present invention.

FIG. 4 is a cross-sectional view showing the optical scanning device according to the present invention. FIG. 5 is an internal perspective view showing the optical scanning device according to the present invention. As shown in these drawings, the optical scanning device installed on a normal color image formation apparatus supports image formation of four colors using four light beams for scanning. However, the light beams and optical systems overlapped in the cross-sectional view shown in FIG. 4 have substantially the same operation and function, so that description is mainly based on a single optical scanning device and description of the optical scanning devices for the four colors is omitted. However, the optical scanning device according to the present invention is not limited to the two optical scanning devices.

Although the light screening materials 89a and 89b are described, the same effect is provided regarding a flare light projected onto the scanning lens 63 of a scanning optical system 65. In this case, light screening materials 90a and 90b screening the flare light from the scanning lens 64 have an effect of screening the flare light. Further, normally, the scanning lens 63 and the scanning lens 64 disposed in an opposing manner are not symmetric with respect to the central axis of the deflector 62 as a point. As shown in FIG. 3, although the scanning lenses 63 and 64 are bilaterally symmetric, scanning lenses 63 and 64 are shifted to an upper portion of the drawing, namely, light beam irradiation devices 52 to 54. In other words, the deflector 62 is relatively shifted to a lower portion of the drawing relative to the scanning lenses 63 and 64. Thus, the flare light is likely to be leaked from an upper side relative to a line defined by connecting a center of the scanning lens 63 to a center of the scanning lens 64, namely, from a side of the light beam irradiation devices 52 to 54 and is projected onto the opposite scanning lens in many cases. In view of this, preferably, the light screening materials are disposed as the light screening materials 89a and 90a on the upper side relative to the line defined by connecting the center of the scanning lens 63 to the center of the scanning lens 64, namely, on the side of the light beam irradiation devices 52 to 54 as shown in the drawing. More preferably, the light screening materials are disposed as the light screening materials 89b and 90b on the opposite side of the above-mentioned side, namely, the opposite side of the light beam irradiation devices 52 to 54.

Figure 6:
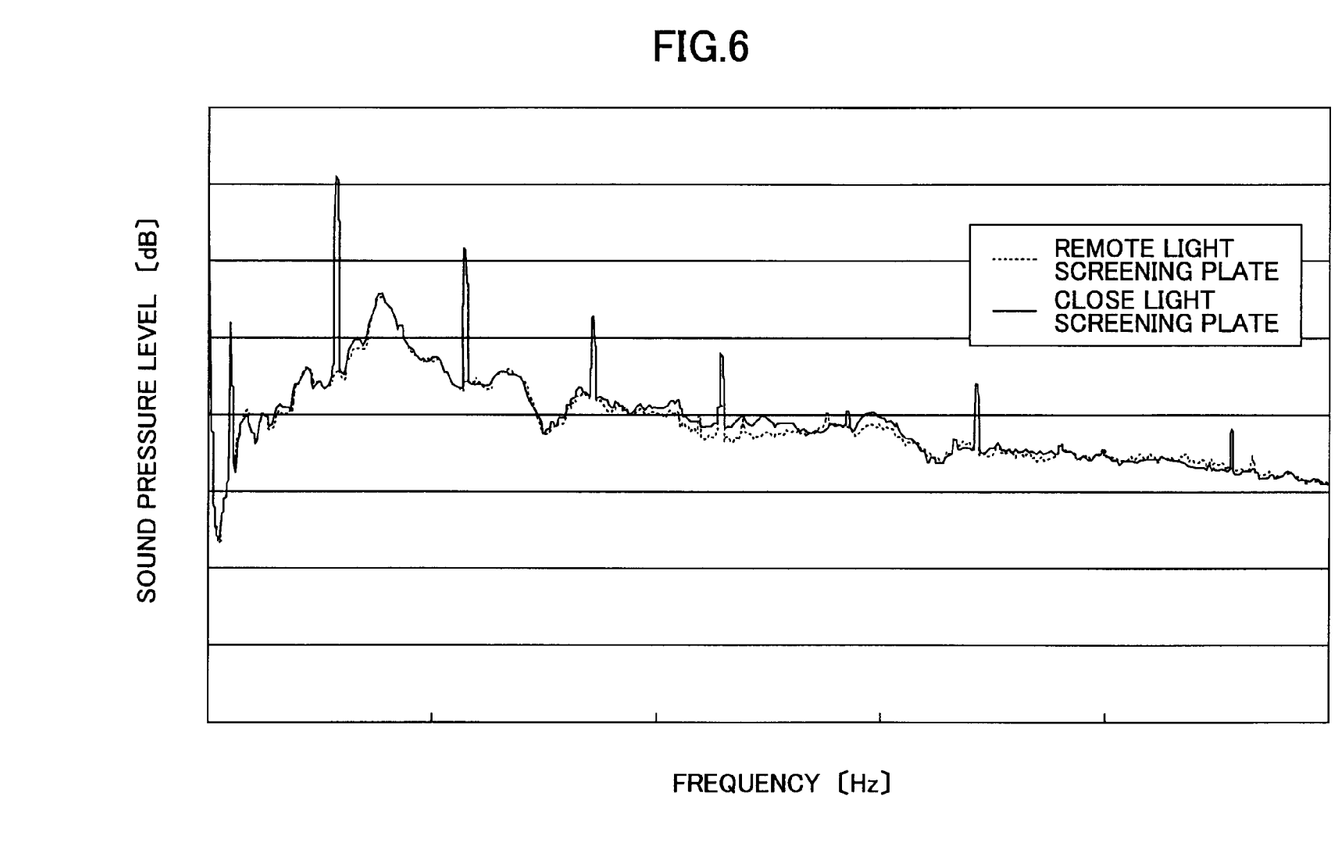
FIG. 6 is a graph showing comparison of noise levels.

More preferably, in the optical scanning device, the light screening material 89a disposed on the upper side relative to the line defined by connecting the center of the scanning lens 63 to the center of the scanning lens 64 in FIG. 3 as mentioned above is disposed on a side of the scanning lens 64 relative to an optical path of a light beam emitted from the light beam irradiation device 54 or 55 to the deflector 62 and intended to be projected onto the scanning lens 64 to be shielded from the flare light in FIG. 3. The light screening material 89a is disposed also on an area of the light beam irradiation devices 54 and 55 relative to an optical path of the light beam irradiated from the deflector 62 onto the scanning lens 64 (an optical path of the light beam deflected for scanning in an uppermost direction of the drawing in this case). The area is out of the optical path of the light beam from the light beam irradiation devices 54 and 55 and is also out of the optical path of the light beam from the deflector 62 to the scanning lens 64. Further, the area is close to the scanning lens 64, capable of effectively screening the flare light from the opposite scanning lens 63, and relatively distant from the deflector 62, so that the area is unlikely to have an influence on the noise of the deflector. FIG. 6 is a graph showing noise levels when the light screening material is disposed closely to the deflector and when the light screening material is disposed relatively distant from the deflector. As understood from the drawing, when the light screening plate is disclosed closely to the deflector, peaks where the noise level is especially increased are generated in each frequency band. This is considered as a factor in the increase of noise.

Figure 7A:
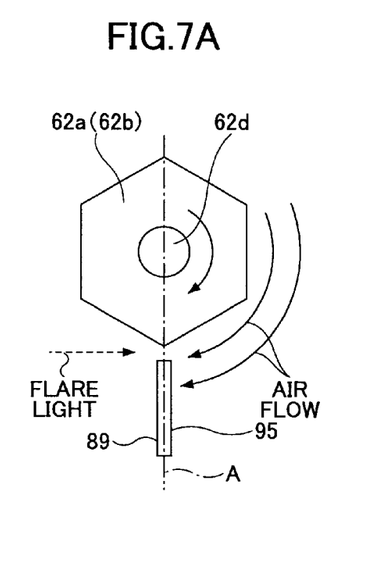
FIG. 7A is a diagram showing a position of a light screening material and an effect thereof.
Figure 7B:
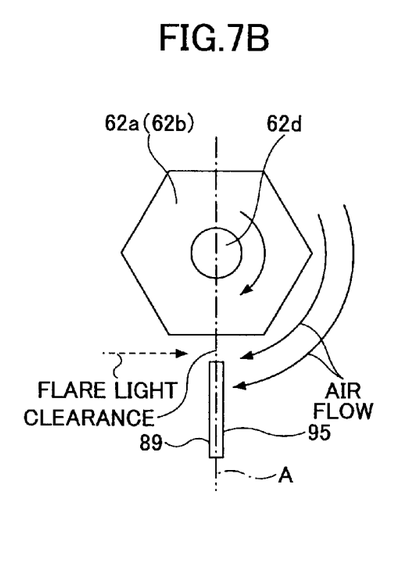
FIG. 7B is a diagram showing a position of a light screening material and an effect thereof.
Figure 7C:
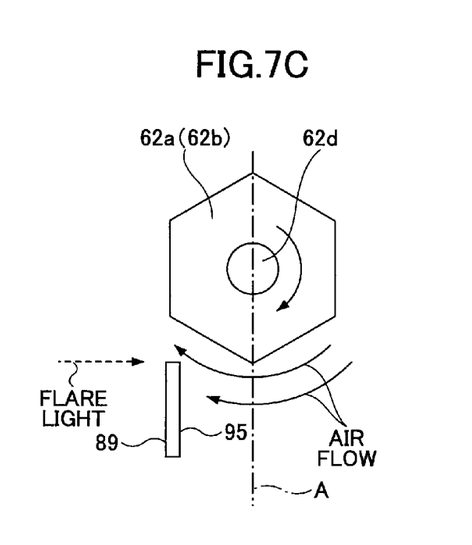
FIG. 7C is a diagram showing a position of a light screening material and an effect thereof.
Figure 7D:
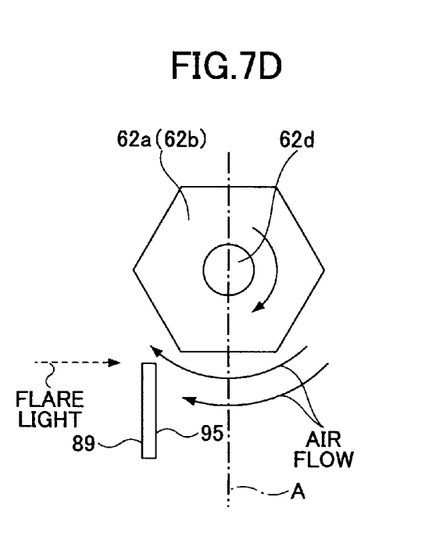
FIG. 7D is a diagram showing a position of a light screening material and an effect thereof.

When the light screening material is disposed so as not to have an influence on a sound of wind noise generated by the deflector, preferably, a light screening surface of the light screening material is planar and a plane including the light screening surface is not overlapped with the central axis of the deflector. Although the area where the light screening material is to be disposed is specified as mentioned above, in some cases, the light screening material is required to be positioned closely to the deflector to such an extent that the light screening material has an influence on the noise of the deflector so as to have an effect of completely screening the flare light. In this case, as mentioned above, when the light screening surface of the light screening material is planar and the light screening surface is not overlapped with a plane including an axis line of the deflector, an air flow generated in accordance with the rotation of the deflector is unlikely to be disturbed, so that noise accompanied by the air flow is not increased. In general, the light screening material has a plate-like shape and preferably the plane of the plate is not overlapped with the plane including the axis line of the deflector. As shown in FIGS. 7A and 7B, when the light screening material 89 is planar, by disposing the light screening material 89 so as to be overlapped with a plane including an axis line of a deflector 62a, noise is likely to be generated when an air flow in accordance with the rotation of the deflector 62a passes by the light screening material 89. By contrast, as shown in FIGS. 7C and 7D, even when the light screening material 89 is planar, by disposing the light screening material 89 so as not to be overlapped with the plane including the axis line of the deflector 62a, noise is unlikely to be generated when the air flow in accordance with the rotation of the deflector 62a passes by the light screening material 89. In particular, when the deflector is a rotating polygon mirror, by tilting the light screening material in a rotation direction of the deflector as shown in FIGS. 7C and 7D, the disturbance of the air flow generated in accordance with the rotation of the deflector is reduced, so that it is possible to reduce generation of noise or vibration.

The light screening material is disposed in a peripheral portion of the deflector and outside the light beam deflection and scanning area by the deflector. When one light screening material faces a corner (edge portion) where deflection surfaces of the deflector are brought into contact, namely, when an end of the light screening material facing the deflector is on a line connecting the central axis of the deflector to the corner where deflection surfaces of the deflector are brought into contact, preferably, other light screening materials are disposed so as not to face corners where the deflection surfaces of the deflector are brought into contact. While the deflector is rotated, noise is likely to be increased at a time when the light screening material faces the corner where the deflection surfaces of the deflector are brought into contact. Thus, such a time when noise is increased is shifted in each light screening material. In other words, when one light screening material is disposed on the line connecting the central axis of the deflector to the corner where deflection surfaces of the deflector are brought into contact and when other light screening materials are also disposed on the line connecting the central axis of the deflector to the corner where deflection surfaces of the deflector are brought into contact, the disturbance of the air flow generated by each light screening material and in accordance with the rotation of the deflector is increased and the time when noise is generated becomes the same, so that an entire noise may be increased. In the present invention, it is possible to prevent such a multiplier effect of the noise increase.

Figure 8:
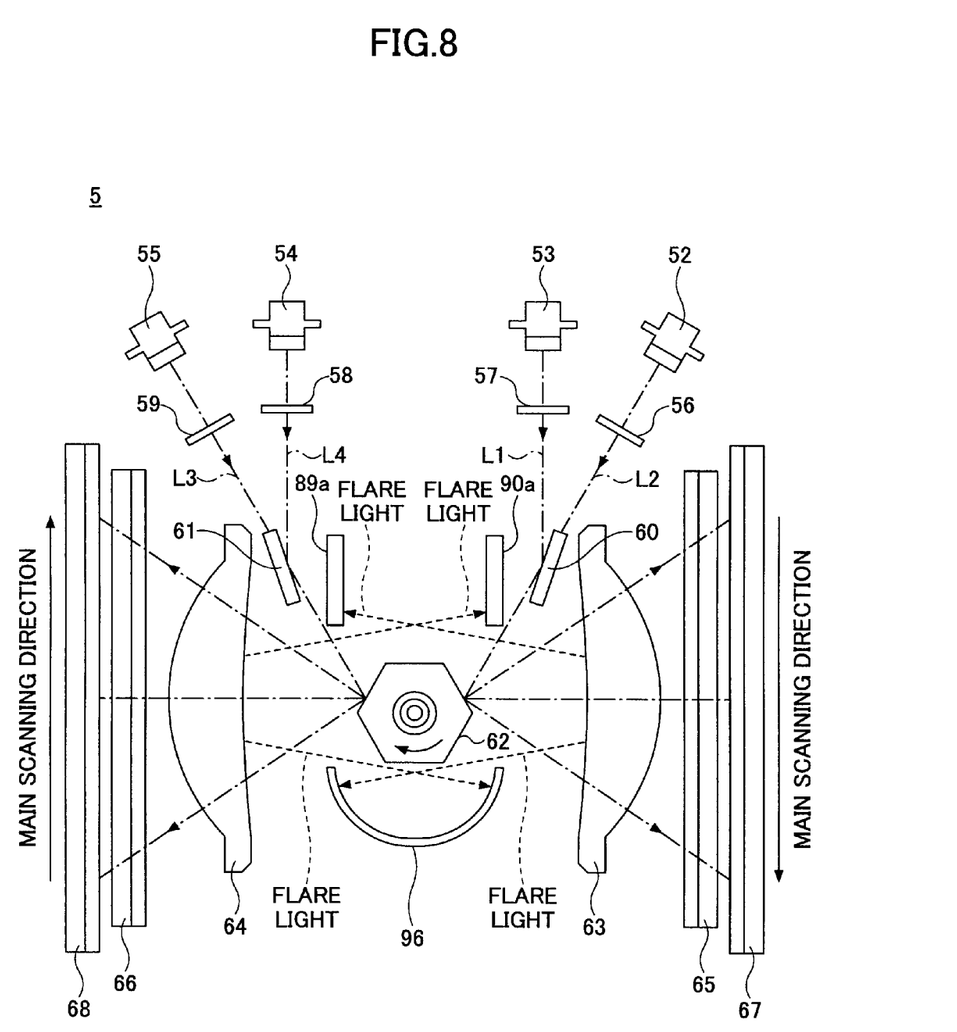
FIG. 8 is a plan view showing an optical scanning device according to the present invention.

When the light screening material unlikely to have an influence on a sound of wind noise by the deflector is constructed, preferably, an inner side of the light screening material is curved and the light screening material is disposed so as to surround the deflector with the curved surface. FIG. 8 shows an example of an optical scanning device 5 in which a curved light screening material is disposed. The optical scanning device 5 in FIG. 8 is different from the optical scanning device 5 in FIG. 6 in that a light screening material 96 is disposed instead of the light screening materials 89b and 90b. In this manner, when the light screening material is curved so as to surround the deflector, preferably, the inner side of the light screening material has an equal distance from the axis of the deflector, the air flow generated on an inner side of the light screening material 96 in accordance with the rotation of the deflector 62 is unlikely to be disturbed. Although a portion corresponding to the light screening material 89b and a portion corresponding to the light screening material 90b are connected in the light screening material 96, it is not necessary to connect these portions as long as the effect of screening the flare light is sufficiently obtained. However, if these portions are separated from a central portion of the light screening material 96, the air flow in accordance with the rotation of the deflector 62 is likely to be disturbed. When the air flow is disturbed, noise may be increased, so that these portions are preferably connected in terms of noise reduction. In FIG. 8, although only the light screening material on one side is curve, the light screening material on the other side may be curved.

Figure 9:
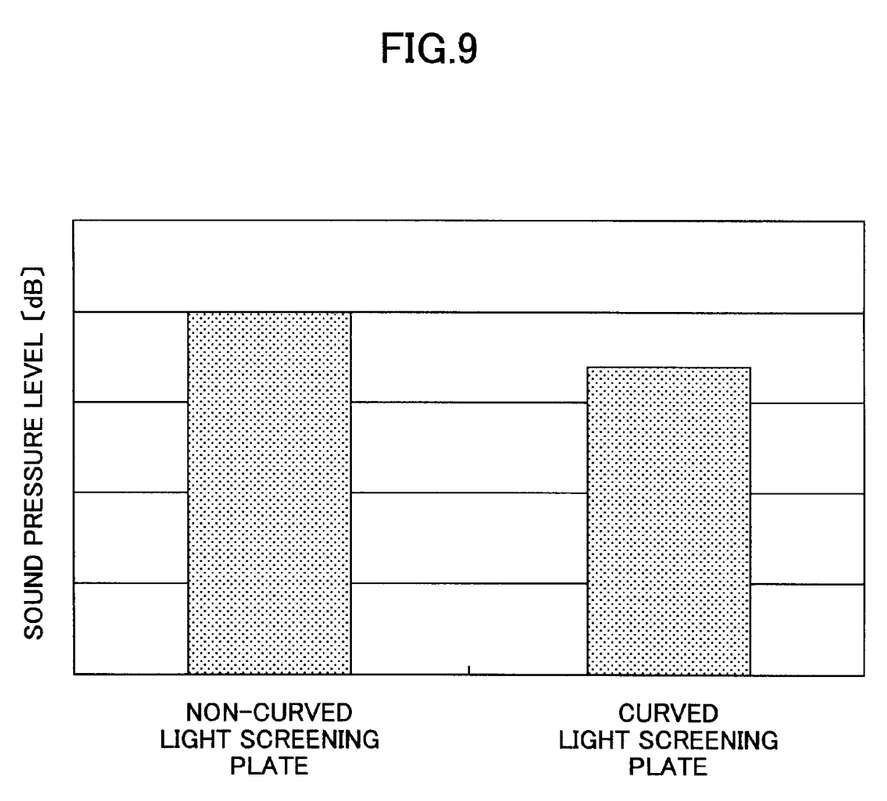
FIG. 9 is a graph showing comparison of noise levels.

FIG. 9 shows comparison of noise levels when the between the optical scanning device as shown in FIG. 3 and the optical scanning device as shown in FIG. 8 when the deflector is rotated at a high speed. As understood from FIG. 9, a noise level of the optical scanning device as shown in FIG. 8 using a curved light screening plate made of the curved light screening material is lower than a noise level of the optical scanning device as shown in FIG. 3 using a non-curved light screening plate.

Figure 10:
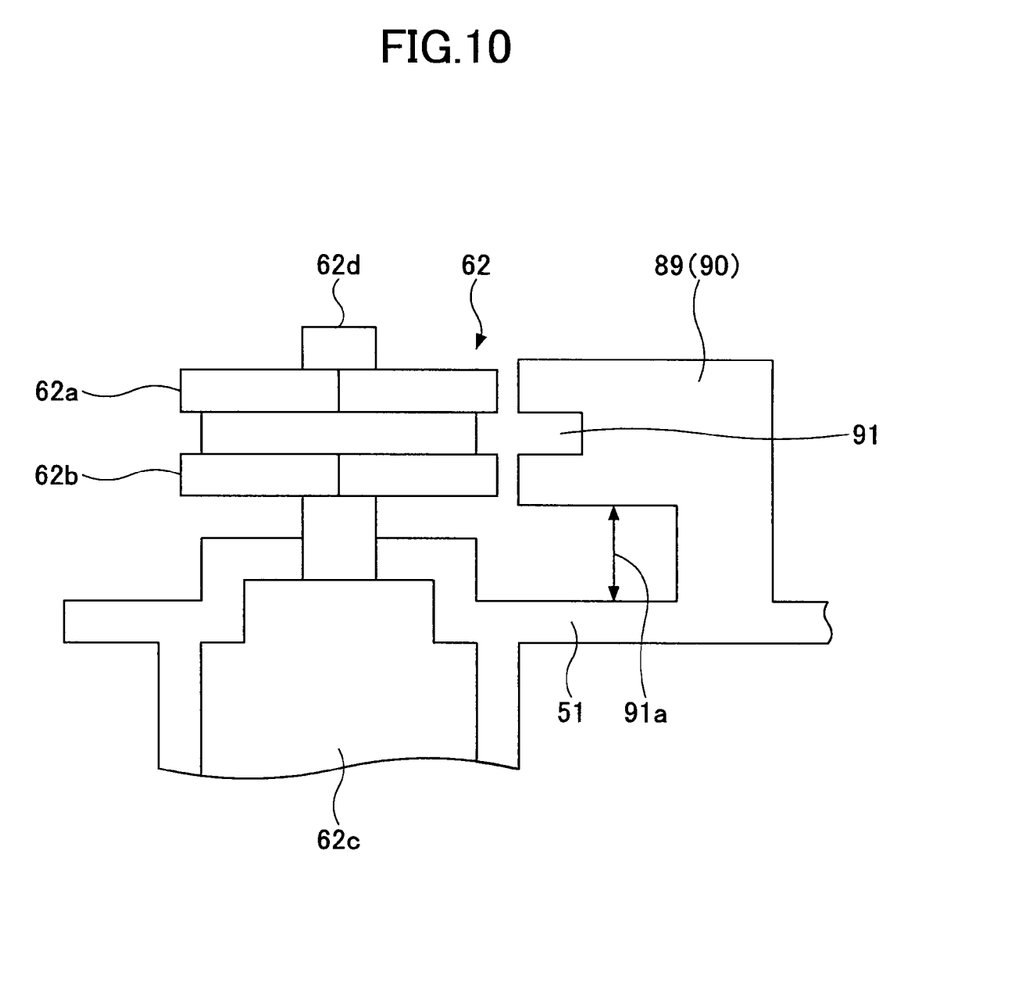
FIG. 10 is a cross-sectional view showing a light screening material.
Figure 11:
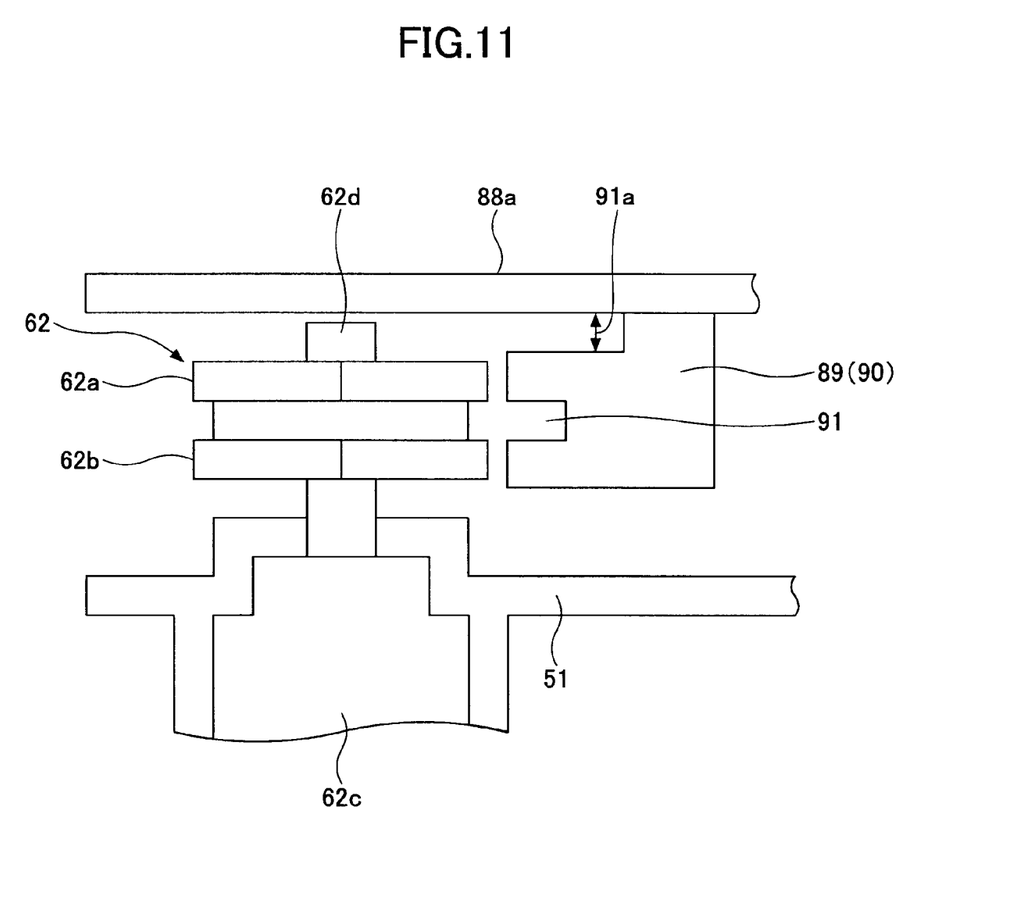
FIG. 11 is a cross-sectional view showing a light screening material.

The deflector generates an air flow in accordance with rotation and this may cause noise, so that the deflector is contained in a case in many cases. In such a case, preferably, the light screening material is formed in an integrated manner with the case, so that the light screening material is fixed on the case. In accordance with this, it is possible to reduce vibration of the light screening material and prevent an increase of noise resulting from a disturbed air flow in the peripheral portion of the deflector. Moreover, when the light screening material is formed in an integrated manner with the case, a number of the members to be manufactured is not increased, so that the light screening material is preferably also in terms of manufacturing of the optical scanning device. FIG. 5 shows an example in which the light screening material is fixed on the case. The light screening materials 89a and 90a are fixed on a bottom of a case 51 of the deflector 62. FIGS. 10 and 11 show examples of light screening material 89 and 89a formed in an integrated manner with the case 51 of the deflector 62. The case is made of opaque resin in the examples. FIG. 10 shows the light screening material 89 formed in an integrated manner with the bottom of the case 51. FIG. 11 shows the light screening material 89a formed in an integrated manner with a lid portion 88a of the case 51.

When not more than three scanning optical systems are disposed and plural rotating polygon mirrors of the deflector are disposed, a group of lenses positioned in an opposing manner may be regarded as one lens and one screening material maybe disposed on each of the groups. For example, as shown in FIG. 5, four scanning lenses of a scanning optical system are disposed and two rotating polygon mirrors of the deflector 62 are disposed, two pairs of scanning lenses overlapped in the vertical direction are regarded as one lens 65 and 66 and each of light screening materials 89a and 90a are disposed on each of the pairs. Preferably, a width of a light screening portion of the light screening materials 89a and 90a is determined so as to screen the flare light which may be projected onto the lens on the opposite side and a slit is disposed on other portion so as to form a path for an air flow generated in accordance with the rotation of the deflector. The deflector is rotated at a high speed and the air flow is generated in the peripheral portion of the deflector, so that when the light screening material is disposed in the vicinity of the deflector, the air flow passes by the deflector and noise or vibration may be generated. However, as shown in FIG. 5, the light screening material is provided with the width only for screening the flare light which may be condensed in the opposite scanning lens and the other portion where the slit is disposed forms the path for letting out the air flow. In accordance with this, disturbance of the air flow is reduced and generation of noise or vibration is reduced. FIGS. 10 and 11 show preferable examples of such a slit. In general, portions of the light screening material 89 facing the deflectors 62a and 62b are necessary and a portion corresponding to a slit portion 91 is not for screening the flare light to the opposite scanning lens in many cases. In such a case, as shown in FIGS. 10 and 11, by disposing the slit 91 on the portion in the light screening materials 89 and 89a, it is possible to reduce noise resulting from the air flow in the peripheral portion of the deflector without reducing the effect of screening the flare light.

Figure 12:
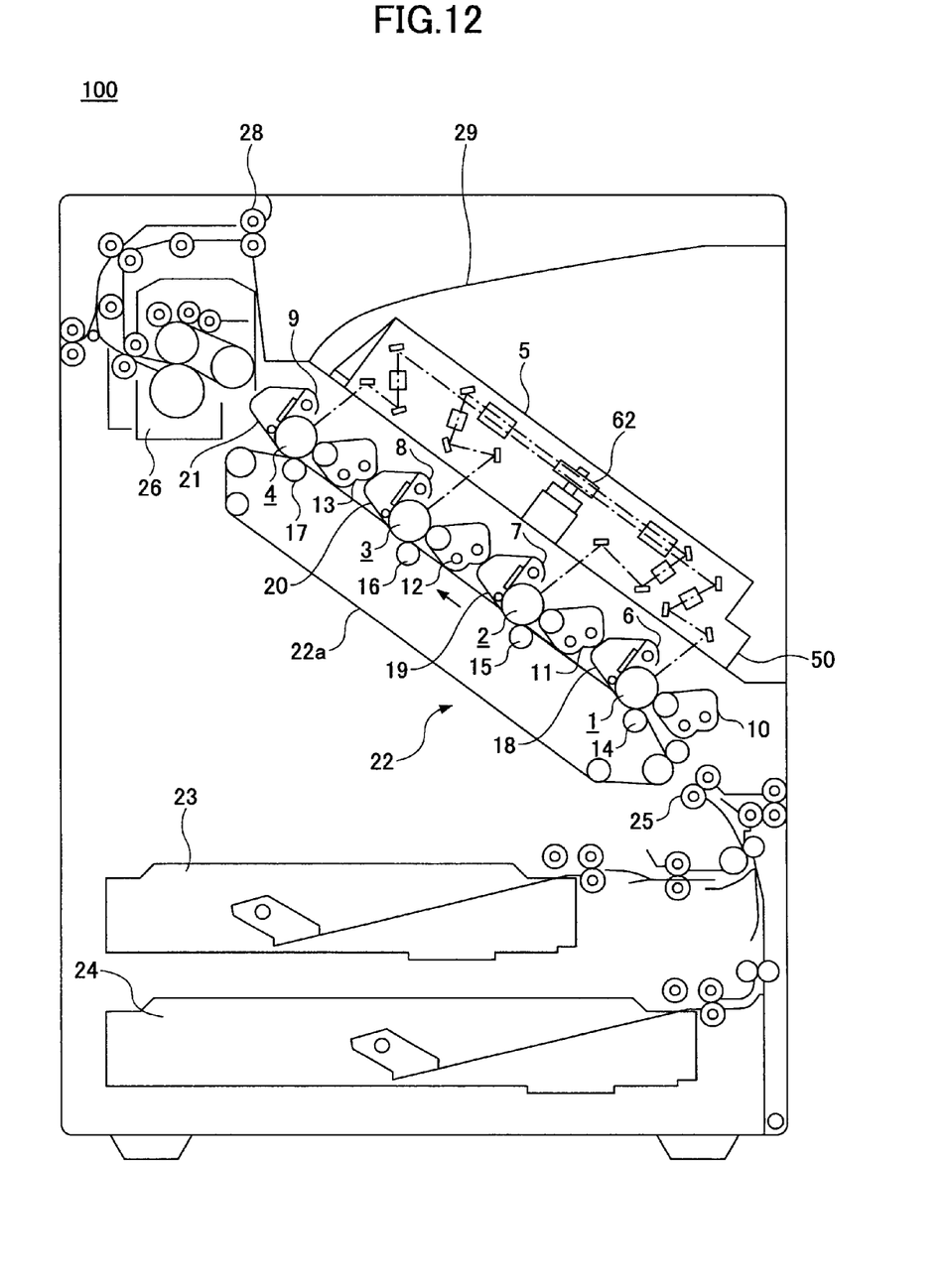
FIG. 12 is a schematic diagram showing an image formation apparatus.

FIG. 12 shows an embodiment of an image formation apparatus according to the present invention. An image formation apparatus 100 includes the optical scanning device 5 according to the present invention as mentioned above. Other portions, namely, paper trays 23 and 24, development devices 18 to 21, transfer device 22, fixing device 26, and the image recording tray 29, and the like are the same elements as those in a conventional image formation apparatus. Although the image formation apparatus 100 includes four optical scanning devices, the image formation apparatus according to the present invention may include not less than two optical scanning devices disposed substantially in an opposing manner relative to the deflector as a center.

The present invention is not limited to the specifically disclosed embodiment, and variations and modifications may be made without departing from the scope of the present invention.

The present application is based on Japanese priority application No. 2006-253501 filed Sep. 19, 2006, the entire contents of which are hereby incorporated herein by reference.

What is claimed is:

1. An optical scanning device comprising:
a plurality of light beam irradiation devices irradiating a light beam;
a deflector deflecting the plural light beams irradiated from the light beam irradiation devices into substantially opposite directions;
scanning optical systems disposed substantially in an opposing manner relative to the deflector as a center, the scanning optical systems each scanning a scanning surface using the light beam deflected by the deflector; and
first and second light screening materials, each comprising a first side and a second side, in which the first side screens a flare light emitted from a first scanning lens in the scanning optical system so as to prevent the flare light from being projected onto a second scanning lens in the substantially opposite scanning optical system, wherein
the first light screening material in which the first side of the light screening material screens the flare light emitted from the first scanning lens is disposed more closely to the second scanning lens than to the first scanning lens, the first light screening material screening the flare light emitted from the first scanning lens is disposed so as not to prevent a flare light emitted from the second scanning lens from being projected onto the first scanning lens, the second side of the first light screening material does not screen a flare light emitted from the first scanning lens and does not screen a flare light emitted from the second scanning lens, and when the second light screening material extends along a line which connects a central axis of the deflector to a corner where deflection surfaces of the deflector are brought into contact, the first light screening material is arranged so as not to extend along a line which connects the central axis of the deflector to a corner where deflection surfaces of the deflector are brought into contact.

2. The optical scanning device according to claim 1, wherein when the optical scanning device is viewed from an axis direction of the deflector, the first light screening material screening the flare light emitted from the first scanning lens is disposed on the same side as the light beam irradiation device irradiating the light beam to be projected onto the second scanning lens relative to a line defined by connecting a center of the first scanning lens to a center of the second scanning lens.

3. The optical scanning device according to claim 1, wherein when the optical scanning device is viewed from an axis direction of the deflector, the first light screening material screening the flare light emitted from the first scanning lens is disposed on an area of a second scanning lens side relative to an optical path of the light beam irradiated from the light beam irradiation device to the deflector and projected onto the second scanning lens and on an area of an optical path side of the light beam relative to an optical path of the light beam irradiated from the deflector onto the second scanning lens.

4. The optical scanning device according to claim 1, wherein when the optical scanning device is viewed from an axis direction of the deflector, the first light screening material screening the flare light emitted from the first scanning lens is disposed on the opposite side of the light beam irradiation device irradiating the light beam to be projected onto the second scanning lens relative to a line defined by connecting a center of the first scanning lens to a center of the second scanning lens.

5. The optical scanning device according to claim 1, wherein the first light screening material is fixed on a case containing the deflector.

6. The optical scanning device according to claim 1, wherein:

the first and second sides of the first light screen material are planar and extend parallel to the line which connects the central axis of the deflector to the corner where deflection surfaces of the deflector are brought into contact; and the first and second sides of the second light screening material are planar and do not extend along the line which connects the central axis of the deflector to the corner where deflection surfaces of the deflector are brought into contact.

7. A light screening device including a first light screening material and a second light screening material disposed on an optical scanning device, the optical scanning device including:

a plurality of light beam irradiation devices irradiating a light beam;

a deflector deflecting the plural light beams irradiated from the light beam irradiation devices into substantially opposite directions; and scanning optical systems disposed substantially in an opposing manner relative to the deflector as a center, the scanning optical systems each scanning a scanning surface using the light beam deflected by the deflector, and the first light screening material comprising:

a slit, wherein the first and second light screening materials each include a first side and a second side, in which the first side screens a flare light emitted from one of scanning lenses disposed in an opposing manner in the scanning optical systems disposed substantially in an opposing manner, the first light screening material does not screen a flare light emitted from another of scanning lenses disposed in an opposing manner, the second side of the light screening material does not screen a flare light emitted from the one scanning lens and does not screen a flare light emitted from the another scanning lens, and when the second light screening material extends along a line which connects a central axis of the deflector to a corner where deflection surfaces of the deflector are brought into contact, the first light screening material is arranged so as not to extend along a line which connects the central axis of the deflector to a corner where deflection surfaces of the deflector are brought into contact.

* * * * *